(12) United States Patent
Huang et al.

(10) Patent No.: US 6,438,272 B1
(45) Date of Patent: Aug. 20, 2002

(54) METHOD AND APPARATUS FOR THREE DIMENSIONAL SURFACE CONTOURING USING A DIGITAL VIDEO PROJECTION SYSTEM

(75) Inventors: Peisen S. Huang, Coram; Fu-Pen Chiang, Stony Brook, both of NY (US)

(73) Assignee: The Research Foundation of State University of NY, Stony Brook, NY (US)

( * ) Notice: Subject to any disclaimer, the term of this patent is extended or adjusted under 35 U.S.C. 154(b) by 0 days.

(21) Appl. No.: 09/223,929

(22) Filed: Dec. 31, 1998

Related U.S. Application Data

(60) Provisional application No. 60/070,138, filed on Dec. 31, 1997.

(51) Int. Cl.[7] .................................................. G06K 9/36
(52) U.S. Cl. ...................... 382/286; 382/149; 382/141; 356/4.09
(58) Field of Search .................................. 382/286, 293, 382/268, 154, 151, 199, 141, 203, 206, 207, 210, 291, 149; 356/376, 374, 375, 4.09

(56) References Cited

U.S. PATENT DOCUMENTS

| | | | |
|---|---|---|---|
| 3,694,088 A | | 9/1972 | Gallagher et al. |
| 3,749,493 A | | 7/1973 | Macovski |
| 4,639,139 A | | 1/1987 | Wyant et al. |
| 4,641,972 A | | 2/1987 | Halioua et al. |
| 4,657,394 A | * | 4/1987 | Halioua ...................... 356/376 |
| 4,984,893 A | | 1/1991 | Lange |
| 4,988,886 A | | 1/1991 | Palum et al. |
| 5,069,548 A | | 12/1991 | Boehnlein |
| 5,075,562 A | | 12/1991 | Greivenkamp, Jr. et al. |
| 5,085,502 A | * | 2/1992 | Womack et al. ............ 356/376 |
| 5,307,151 A | | 4/1994 | Hof et al. |
| 5,307,152 A | | 4/1994 | Boehnlein et al. |
| 5,561,526 A | * | 10/1996 | Huber et al. ................ 356/376 |
| 5,612,786 A | * | 3/1997 | Huber et al. ................ 356/376 |
| 5,636,025 A | * | 6/1997 | Bieman et al. ............. 356/374 |
| 5,825,495 A | | 10/1998 | Huber |
| 5,835,218 A | | 11/1998 | Harding |

FOREIGN PATENT DOCUMENTS

EP          0076866          4/1983

OTHER PUBLICATIONS

Author: Giovanna Sansoni et al.; Title: "A Novel, Adaptive System for 3–D Optical Profilometry Using a Liquid Crystal Light Projector"; *IEEE Transactions on Instrumentation and Measurement* 43(4):558–566; Date of Publication: Aug. 4, 1994; Place of Publication: U.S.

Arai, Yasuhiko, Yekozeki, Shunsuke, and Yamada, Tomoharu, "3–D automatic precision measurement system by liquid crystal plate on moiré–topography," Proc. SPIE, vol. 1554B, 266–274 (1991).

Asundi, A., "Novel grating methods for optical inspection," Proc. SPIE, vol. 1554B, 708–715 (1991).

Asundi, A., "Projection moiré using PSALM," Proc. SPIE, vol. 1554B, 257–265 (1991).

(List continued on next page.)

*Primary Examiner*—Joseph Mancuso
*Assistant Examiner*—Yosef Kassa
(74) *Attorney, Agent, or Firm*—Hoffman & Baron, LLP

(57) ABSTRACT

A novel three dimensional surface contouring method has been developed based on the fall-field fringe projection technique. A digital video projection system is used to project digitally created fringe patterns onto the object. The fringe pattern distorted by the geometry of the object surface is then captured by a high resolution CCD camera. To increase contouring resolution, purely software-based digital phase shifting technique is used, which eliminates the need for accurate positioning systems in the traditional phase shifting methods. The surface is reconstructed by applying the phase wrapping and unwrapping algorithms.

24 Claims, 11 Drawing Sheets

OTHER PUBLICATIONS

Asundi, A., "Fringe analysis in moiré interferometry," Proc. SPIE, vol. 1554B, 472–480 (1991).

Bieman, Leonard H., "Survey of design considerations for 3–D imaging systems," Proc. SPIE, vol. 1005, 138–144 (1988).

Bieman, Leonard H., Harding, Kevin G., and Boehnlein, Albert, "Absolute measurement using field shifted moiré," Proc. SPIE, 1614, 259–264 (1991).

Boehnlein, A.J. and Harding, K.G., "Adaptation of a Parallel Architecture Computer to Phase Shifted Moiré Interferometry," Proc. SPIE, vol. 278, 183–193 (1986).

Boehnlein, Albert, and Harding, Kevin G., "Field shift moiré, a new technique for absolute range measurement," Proc. SPIE, vol. 1163, 2–9 (1989).

Bruning, J. H., Herriott, D.R., Gallagher, J.E., Rosenfeld, D.P., White, A. D., and Brangaccio, D. J., "Digital Wavefront Measuring Interferometer for Testing Optical Surfaces and Lenses," Appl. Opt., 13, 2693 (1974).

Chiang, F. P., "Moire Methods for Contouring, Displacement, Deflection, Slope, and Curvature," Proc. SPIE, vol. 153, 113–119 (1978).

Chiang, F.P., "Techniques of optical signal filtering parallel to the processing of moiré–fringe patterns," Exp. Mech., 9(11), 523–526 (1969).

Creath, K. "Phase–Measurement Interferometry Techniques," in Progress in Optics. vol. XXVI, E. Wolf, Ed., Elsevier Science Publishers, Amsterdam, 1988, pp. 349–393).

Dai, Y.Z. and Chiang, F.P., "Moiré interferometry applied to topographic contour measurement," Proc. SPIE, 954, (1988).

Geng, Z. Jason, "Rainbow three–dimensional camera: new concept of high–speed three–dimensional vision systems," Optical Engineering, 35 (2), 376–383 (1996).

Greivenkamp, J. E., "Generalized Data Reduction for Heterodyne Interferometry," Opt. Eng., 23, 350 (1984).

Greivenkamp, J.E. and Bruning, J.H., "Phase Shifting Interferometry," in Optical Shop Testing, 2d Ed., Daniel Malacara, John Wiley & Sons, pp. 501–598 (1992).

Halioua, M., Krishnamurthy, R.S., Liu, H. –C., and Chiang, F.P., "Automated 360° Profilometry of 3–D Diffuse Objects," Appl. Opt., 24(12), 2193–2196 (1985).

Halioua, M., Krishnamurthy, R. S., Liu, H., and Chiang, F. P., "Projection moire with moving gratings for automated 3–D topography," Appl. Opt. 22, 850–855 (1983).

Halioua, M. and Liu, H. –C., "Optical Three–Dimensional Sensing by Phase Measuring Profilometry," Opt. Lasers Eng., 11(3), 185–215 (1989).

Harding, K.G., Coletta, Michael P., Van Dommelen Carl H., "Color encoded moiré contouring," SPIE Proc. vol. 1005 Optics, Illumination, and Image Sensing for Machine Vision III, 169–178 (1988).

Hariharan, P., Oreb, B. F., and Eiju, T., "Digital Phase–Shifting Interferometry: A Simple Error–Compensating Phase Calculation Algorithm," Appl. Opt., 26, 2504 (1987).

Hobrogh, G. and Hobrough, T., "Stereopsis for robots by iterative stereo image matching," Proc. SPIE, vol. 449, 94–102 (1983).

Hornbeck, Larry, J., "Deformable–Mirror Spacial Light Modulators," Proc. SPIE, vol. 1150 (1989).

Hornbeck, Larry, J., "Digital Light Processing and MEMS: Timely Convergence for a Bright Future," available at http://www.ti.com (1996).

Huang, P.S., Hu, Q., Jin, F., and Chiang F.P., "Color–encoded fringe projection and phase shifting for 3D surface contouring," Proc. SPIE vol. 3407, 477–482 (1998).

Kujawinska, M., "Use of Phase–Stepping Automatic Fringe Analysis in Moiré Interferometry," Appl. Opt. 26(22), 4712–4714 (1987).

Moore, D.T. and Traux, B.E., "Phase–Locked Moiré Fringe Analysis for Automated Contouring of Diffuse Surfaces," Appl. Opt., 18(1), 91–96 (1979).

Sansoni, G., Docchio F., Minoni U., and Bussolati C., "Development and characterization of a liquid crystal projection unit for adaptive structured illumination," Proc. SPIE, 1614, 78–86 (1991).

Schwider, J. Burow, R., Elssner, K. E., Grzanna, J., Spolaczyk, R., and Merkel K., "Digital Wavefront Measuring Interferometry: Some Systematic Error Sources," Appl. Opt., 22, 3421 (1983).

Shaw, M.M., Harvey, D.M., Hobson, C.A., and Lalor, M.J., "Non–contact ranging using dynamic fringe projection," Proc. SPIE, vol. 1163, 22–29 (1989).

Srinivasan, V. H., Liu, H. –C., and Halioua, M., "Automated Phase–Measuring Profilometry of 3–D Diffuse Objects," Appl. Opt., 23(18), 3015–3018 (1984).

Srinivasan, V. H., Liu, H. –C., and Halioua, M., "Automated Phase–Measuring Profilometry: a phase mapping approach." Appl. Opt., 24(2), 185–188 (1985).

Stahl, Philip H., "White–light phase–measuring interferometry," Proc. SPIE, vol. 1332, 720–728 (1990).

Stumpf, K.D., "Real–Time Interferometer," Opt. Eng., 18, 648 (1979).

Takasaki, H., "Moirë Topography," Applied Optics 9 (6), 1457–1472 (1970).

Toyooka, S. and Iwaasa, Y., "Automatic Profilometry of 3–D Diffuse Objects by Spatial Phase Detection," Appl. Opt., 25(10), 1630–1633 (1986).

Wizinowich, P. L., "System for Phase Shifting Interferometry in the Presence of Vibration," Proc. SPIE, 1164, 25 (1989).

Wizinowich, P. L., "Phase Shifting Interferometry in the Presence of Vibration: A New Algorithm and System," Appl. Opt., 29, 3271 (1990).

Wyant, J.C., "Use of an ac heterodyne lateral shear interferometer with real–time wavefront correction systems," Appl. Opt., 14, 2622 (1975).

Yoshizawa, Toru and Tomisawa, Teiyu, "Moiré topography with the aid of phase shift method," Proc. SPIE, 1554B, 441–450 (1991).

Younse, J.M., "Mirror on a chip," IEEE Spectrum, 30(11),27 (1993).

* cited by examiner

FIG-8
FIG-9
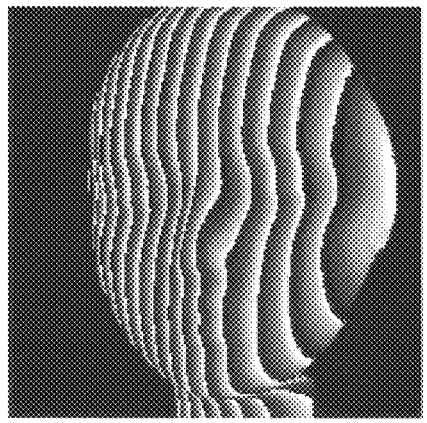
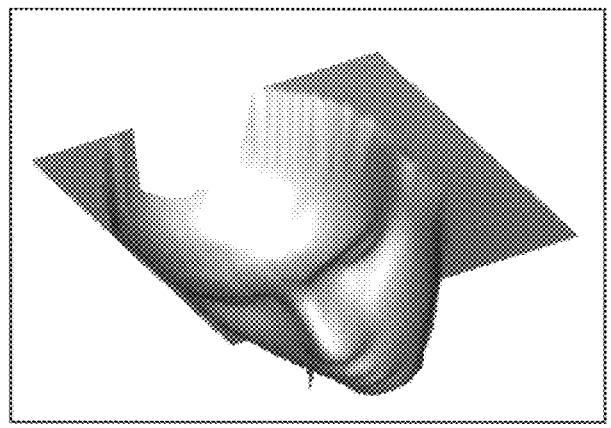

METHOD AND APPARATUS FOR THREE DIMENSIONAL SURFACE CONTOURING USING A DIGITAL VIDEO PROJECTION SYSTEM

This application claims the benefit of U.S. Provisional Application No. 60/070,138, filed Dec. 31, 1997.

STATEMENT OF GOVERNMENT RIGHTS

This invention was made with Government support under grant No. DMI 9713895 provided by the National Science Foundation. The Government has certain rights in the invention.

BACKGROUND OF THE INVENTION

The present invention relates generally to a method and apparatus for three dimensional surface contouring. In particular, the present invention uses a digital video projection system for digitally generating fringe patterns in three dimensional surface contouring.

Three dimensional surface contouring techniques have numerous applications in design and manufacturing. For example, surface contouring can be used for inspection of industrial parts whose dimensions and geometry need to be checked against their design specifications during or after manufacturing. These techniques can also be used in reverse engineering where construction of a Computer Aided Design (CAD) model from a physical part is required. In recent years, rapid prototyping technology based on a layered manufacturing concept has been established which allows for rapid fabrication of physical concept models, functional parts, and toolings directly from CAD models. Surface contouring techniques can help extend the capabilities of current rapid prototyping systems to include building physical parts and toolings from hand-crafted models or parts for which a CAD model is not available. Surface contouring techniques can also help improve the accuracy of constructed models by introducing in-process or post-process inspection into the rapid prototyping process.

Many optical three dimensional contouring methods have been developed and are well known in the art. The methods can generally be categorized into two groups: scanning and non-scanning imaging techniques. (Bieman, Leonard H., "Survey of design considerations for 3-D imaging systems," Proc. SPIE, Vol. 1005, 138–144 (1998)). The scanning techniques are represented by point triangulation (Blais, F. and Rioux, M., "BIRIS: a simple 3-D sensor," Proc. SPIE, Vol. 723, 235 (1986)), laser radar (Svetkoff, D. J., Leonard, P. F., and Sampson, R. E., "Techniques for real-time, 3-D feature extraction using range information," Proc. SPIE, Vol. 521, 302 (1984)), and structured line methods. Point triangulation and structured line methods are based on the triangulation principle and the laser radar methods are based on the measurement of the travel time or phase of either a pulsed or modulated laser. All these techniques require either one-dimensional or two-dimensional scanning of the laser to cover the entire surface of the object. This generally makes the systems more sophisticated and the measurement more time consuming.

Typical non-scanning techniques include stereo vision and moiré interferometry. Stereo vision obtains three-dimensional information of an object by viewing a scene from two different perspectives and then locating common features in both images. (Hobrough, G. and Hobrough, T., "Stereopsis for robots by iterative stereo image matching," Proc. SPIE, Vol. 449, 62 (1983)). The processing of the images is computationally intensive, which makes the technique unsuitable for high-speed 3-D contouring.

Moiré interferometry is one of the most commonly used techniques for 3-D surface contouring. Compared to other techniques, it has the primary advantage of fast measurement speed due to the fact that it does not require scanning to cover the whole object surface and the image processing for extracting 3-D contour information is relatively simple. Moiré contouring techniques can be classified as either shadow moiré (Chiang, F. P., "Moiré Methods for Contouring, Displacement, Deflection, Slope, and Curvature," Proc. SPIE, Vol. 153, 113–119 (1978)) or projection moiré (Khetan, R. P. and F. P. Chiang, "On the theory of two projection moiré methods," Univ. Of Ill. at Chicago press, 8, 16–18 (1977); Halioua, M., Krishnamurthy, R. S., Liu, H., and Chiang, F. P., "Projection moiré with moving gratings for automated 3-D topography," Appl. Opt. 22, 850–855 (1983)). Shadow moiré uses the same grating for both illumination and observation, while projection moiré uses separated gratings. Another surface contouring technique is fringe projection which uses only one grating and measures surface height by triangulation.

An advantage of shadow moiré is that it is easy to obtain quantitative contour information from the moiré pattern because the grating is flat and its period known. However, the contouring of large objects is difficult because a grating with approximately the same size as the object must be used. Large gratings are difficult to make and have limited mobility.

Projection moiré and fringe projection offer advantages in their ability to contour large objects and the ease with which phase measuring techniques can be implemented to increase the measurement resolution. Their primary limitation is the tedium associated with obtaining quantitative height information. This limitation arises because it is necessary to calibrate both the projection geometry and the magnification factor.

In order to increase contouring resolution, phase shifting techniques developed in interferometry have been widely adopted and used in moiré and fringe projection methods for 3-D surface contouring. The resolution of the moiré and fringe projection contouring methods depends on the density of the fringe projected on the object. Generally, higher fringe density means higher resolution. However, there is a limit to the fringe density that can be applied because overly dense fringes may not be resolvable by the camera. To solve this dilemma, phase shifting techniques have been developed and widely used in optical contouring applications (Halioua, M. and Liu, H. -C., "Optical Three-Dimensional Sensing by Phase Measuring Profilometry," Opt. Lasers Eng., 11(3), 185–215 (1989); Moore, D. T. and Truax, B. E., "Phase-Locked Moiré Fringe Analysis for Automated Contouring of Diffuse Surfaces," Appl. Opt., 18(1), 91–96 (1979); Srinivasan, V. H., Liu, H. -C., and Halioua, M., "Automated Phase-Measuring Profilometry of 3-D Diffuse Objects," Appl. Opt., 23(18), 3015–3018 (1984); Srinivasan, V. H., Liu, H. -C., and Halioua, M., "Automated Phase-Measuring Profilometry of 3-D Diffuse Objects," Appl. Opt., 24(2), 185–188 (1985); Boehnlein, A. J. and Harding, K. G., "Adaptation of a Parallel Architecture Computer to Phase Shifted Moiré Interferometry," Proc. SPIE, Vol. 728, 183–193 (1986); Kujawinska, M., "Use of Phase-Stepping Automatic Fringe Analysis in Moiré Interferometry," Appl. Opt. 26(22), 4712–4714 (1987); Toyooka, S. and Iwaasa, Y., "Automatic Profilometry of 3-D Diffuse Objects by Spatial Phase Detection," Appl. Opt.,25(10), 1630–1633 (1986)). Phase shifting dramatically increases measurement resolution without the need of using high density fringes. Traditional phase shifting is accomplished by mechanically shifting a grating to create a series of phase shifted fringe patterns. The phase shifted fringe patterns then are processed to extract the phase of each pixel of the image using algorithms well known in the art.

Phase shifted images are generally obtained by mechanically translating a grating. The shortcomings are that the system becomes more complicated because of the introduction of moving parts into the system and the phase shifting may not be accurate due to mechanical errors. The Phase Shifting And Logical Moiré (PSALM) was proposed to eliminate some of the problems with traditional phase shifting techniques (Asundi, A., "Projection moiré using PSALM," Proc. SPIE, Vol. 1554B, 257–265 (1991)). PSALM uses only one grating with the other grating generated by software in a computer. The phase-shifted moiré fringes are obtained through logic calculations on the image of the object and the software created grating. Since no moving parts are necessary, this technique greatly simplifies the contouring system. The problem with this technique is that the contouring result is subject to possible errors due to surface reflectivity changes and existing surface marks. Other attempts to simplify the contouring system used a Liquid Crystal Display (LCD) panel as the projection system (Asundi, A., "Fringe Analysis in Moiré Interferometry," Proc. SPIE, Vol. 1554B, 472–480 (1991); Arai, Yasuhiko, Yekozeki, Shunsuke, and Yamada, Tomoharu, "3-D automatic precision measurement system by liquid crystal plate on moiré-topography," Proc. SPIE,Vol. 1554B, 266–274 (1991)). With the creation of the fringe pattern and phase shifting being done by software, the system is flexible and simple. However, because of the low image brightness and contrast of LCD panels (Sansoni, G., Docchio F., Minoni U., and Bussolati C., "Development and characterization of a liquid crystal projection unit for adaptive structured illumination," Proc. SPIE, 1614, 78–86 (1991)), the quality of the fringe pattern reflected from the object is poor which causes errors in extracting surface contour information. For this reason, any meaningful contouring can only be done for small objects.

Another traditional problem associated with the phase-shifting technique is the modulo $2\pi$ ambiguity caused by the phase extraction process using the arc-tangent function which has values only between $-\pi/2$ and $\pi/2$. Even though with corrections, the phase calculation range can be extended to 0 to $2\pi$, the absolute phase still cannot be recovered. This means that if the object surface has discontinuous features, such as step-like jumps, and the height change causes a phase change exceeding $2\pi$, then the phase extraction process cannot provide the correct height information. Accordingly, traditional phase shifting technology usually cannot be applied to measure surfaces with discontinuous geometric features. To eliminate this problem, a new technique, namely, field-shift moiré, was proposed (Boehnlein, Albert, and Harding, Kevin G., "Field shift moiré, a new technique for absolute range measurement," Proc. SPIE, Vol. 1163, 2–9 (1989)). Field-shift moiré shifts the whole projection system including the grating and the light source to capture a series of field-shifted images. With proper mathematical manipulation, both the fringe order and the phase of each pixel can be extracted to yield absolute measurement of the surface contour even for prismatic objects with discontinuous features. The problem, however, is the need to shift the whole projection system in accurate steps, which makes the system even more complicated than the traditional grating shifting technique.

When using phase shifting, at least three images, each with certain phase shift, must be taken to reconstruct the contour of the object. Traditionally, these phase shifted images are taken sequentially which limits the technique only to the contouring of static objects. In many engineering applications, 3-D surface contouring of objects under quasi-static or dynamic changes provides critically important information about the objects. In such applications, quickly capturing 3-D surface contours of objects becomes necessary. There have been some reports on using color as a means to boost contouring speed while keeping the resolution intact. K. G. Harding "Color encoded moiré contouring," SPIE Proc. Vol. 1005 Optics, Illumination, and Image Sensing for Machine Vision III, 169–178 (1988) and European Patent No. EP0076866. Harding proposed a color-encoded moiré technique that retrieves the 3-D surface contour of an object from a single snap shot of the object illuminated by a color-encoded fringe pattern. Contouring speed was limited only by the frame rate of the camera. However, since the color-encoded fringe pattern produced on a Polaroid film had a poor contrast ratio, no actual contouring of objects was attempted.

European Patent No. EP0076866 discloses the simultaneous projection of three color-coded patterns on an object with the patterns being phase-shifted by 120 degrees relative to each other. The grating patterns deformed by the object surface are recorded corresponding to their color coding by three associated color-selective cameras. As a result of this, the pattern is recorded simultaneously in three different phase relations so that an evaluation based on phase shifting algorithms may be performed without requiring a mechanical shifting.

Each of the methods and apparatus described above has inherent shortcomings which detract from their use in three dimensional imaging, and it is an object of the present invention to overcome such shortcomings and to provide an improved method and apparatus for three dimensional surface contouring.

SUMMARY OF THE INVENTION

The present invention is a method and apparatus for three dimensional surface contouring. The present invention uses a digital video projector for projecting fringe patterns in surface contouring.

The method of three dimensional surface contouring of an object having a surface defining a geometry includes generating a plurality of phase shifted digitally-interpretable fringe pattern signals with each signal being generated at a separate phase angle. The signals are then converted into optical phase shifted fringe patterns which are projected onto the surface of the object. The geometry of the object distorts the fringe patterns. A reflection of each of the distorted fringe patterns is individually retrieved. The distorted fringe patterns are combined to generate a phase-wrapped image. The phase-wrapped image is unwrapped to reconstruct the surface of the object.

The apparatus for three dimensional surface contouring of an object includes a fringe pattern generator that generates a plurality of phase shifted digitally-interpretable fringe pattern signals with each of the signals being generated at a separate phase angle. A digital video projector receives the signals from the fringe pattern generator. The digital video projector converts the signals into optical fringe patterns and projects the fringe patterns onto the surface of the object. The fringe patterns are distorted by the geometry of the object and an optical retrieval device retrieves a reflection of the distorted fringe pattern. An image generator combines the distorted fringe patterns and reconstructs the surface of the object.

In a preferred embodiment of the invention, at least three phase shifted fringe patterns are generated separated by 120 degrees. The phase shifted fringe patterns can be projected sequentially. Preferably the sequential projection of the phase shifted fringe patterns is synchronized to increase contouring speed. Contouring speed can also be increased by projecting a plurality of phase shifted fringe patterns substantially simultaneously by color encoding the phase shifted fringe patterns. The fringe pattern generator can be a circuit configured to generate the fringe pattern. The fringe pattern generator can be located within the image generator. The fringe pattern generator can also include a mechanical phase shifter for shifting the phase angle. Preferably the fringe pattern generator shifts the phase angle digitally. Preferably where there are a number of phase shifted fringe patterns, the phase shifted fringe patterns are separated by the quotient of 360 degrees divided by the number of phase shifted fringe patterns.

As a result of the present invention, a method and apparatus for three dimensional surface contouring is provided. A particular advantage is that since the fringe patterns are generated digitally and projected by a digital video projector the fringe patterns have exceptionally high brightness and contrast ratio. In addition, since the fringe patterns are generated digitally, fringes with any cross-sectional intensity profile and spacing can be produced. Further, the digitally controlled phase shifting technique eliminates the traditional need for physically shifting a grating or other optical components which translates into higher contouring accuracy. Moreover, fringe patterns can now be easily color encoded for a variety of applications.

For a better understanding of the present invention, reference is made to the following description to be taken in conjunction with the accompanying drawings and its scope will be pointed out in the appended claims.

BRIEF DESCRIPTION OF THE DRAWINGS

Preferred embodiments of the invention have been chosen for purposes of illustration and description and are shown in the accompanying drawings, wherein:

FIG. 8 is a view showing a phase-wrapped image generated from the information contained in FIGS. 6A, 6B, and 6C;

FIG. 9 is a view showing a reconstructed surface of the dummy face shown in FIGS. 6A, 6B, and 6C;

DETAILED DESCRIPTION OF THE INVENTION

Figure 1:
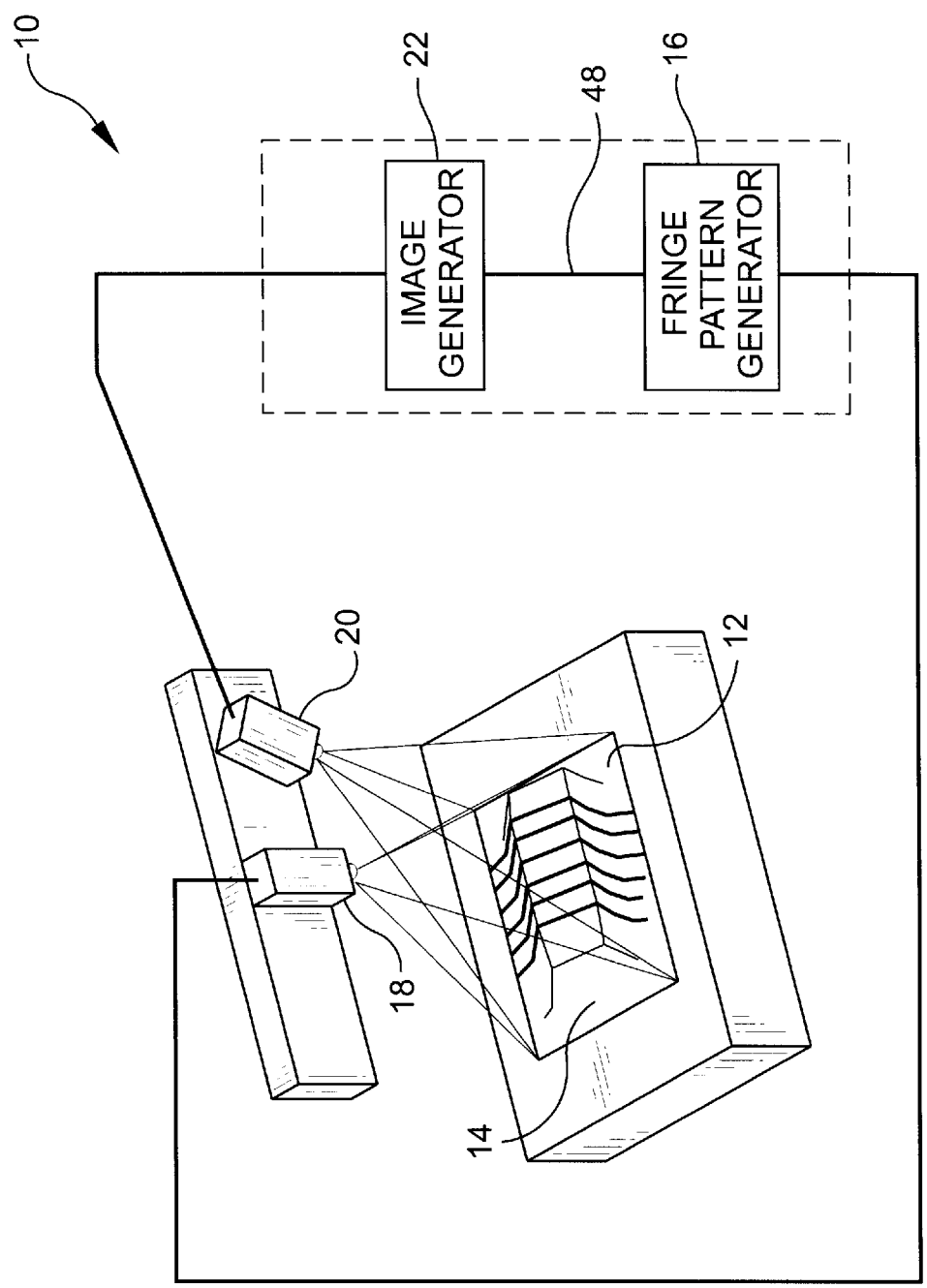
FIG. 1 is a perspective view of the surface contouring device of the present invention with some of the attributes shown schematically.

Initially referring to FIG. 1 a surface contouring device 10 in accordance with the present invention is shown. The surface contouring device 10 includes a fringe pattern generator 16, a digital video projector 18, an optical retrieval device 20, and an image generator 22.

The fringe pattern generator 16 generates a digitally-interpretable fringe pattern signal that is received by the digital video projector 18 for conversion to an optical fringe pattern. The fringe pattern generator 16 is capable of generating digitally-interpretable fringe pattern signals to produce any type of optical fringe pattern including sinusoidal patterns, binary structured-line patterns, and circular patterns as known to those skilled in the art. Most importantly, the fringe pattern generator 16 can generate a plurality of phase shifted digitally-interpretable fringe pattern signals for producing a plurality of optical phase shifted fringe patterns without the traditional mechanical shifting of a grating by shifting the phase angle digitally. The fringe pattern generator 16 can be, for example, any suitable computer, processor (e.g., digital signal processor, microprocessor, etc.), microcontroller, or circuit configured with the teachings hereof In experimentation conducted by the inventors using a computer as the fringe pattern generator 16, the inventors developed a Windows based program in Visual Basic and also in Visual C++ for generating the signals with a computer. During their experimentation, the inventors used a keyboard and video monitor as an interface for modifying the fringe type, intensity profile, spacing, phase, and color. The fringe pattern generator can also use embedded circuitry tailored to specific industrial applications.

Figure 2:
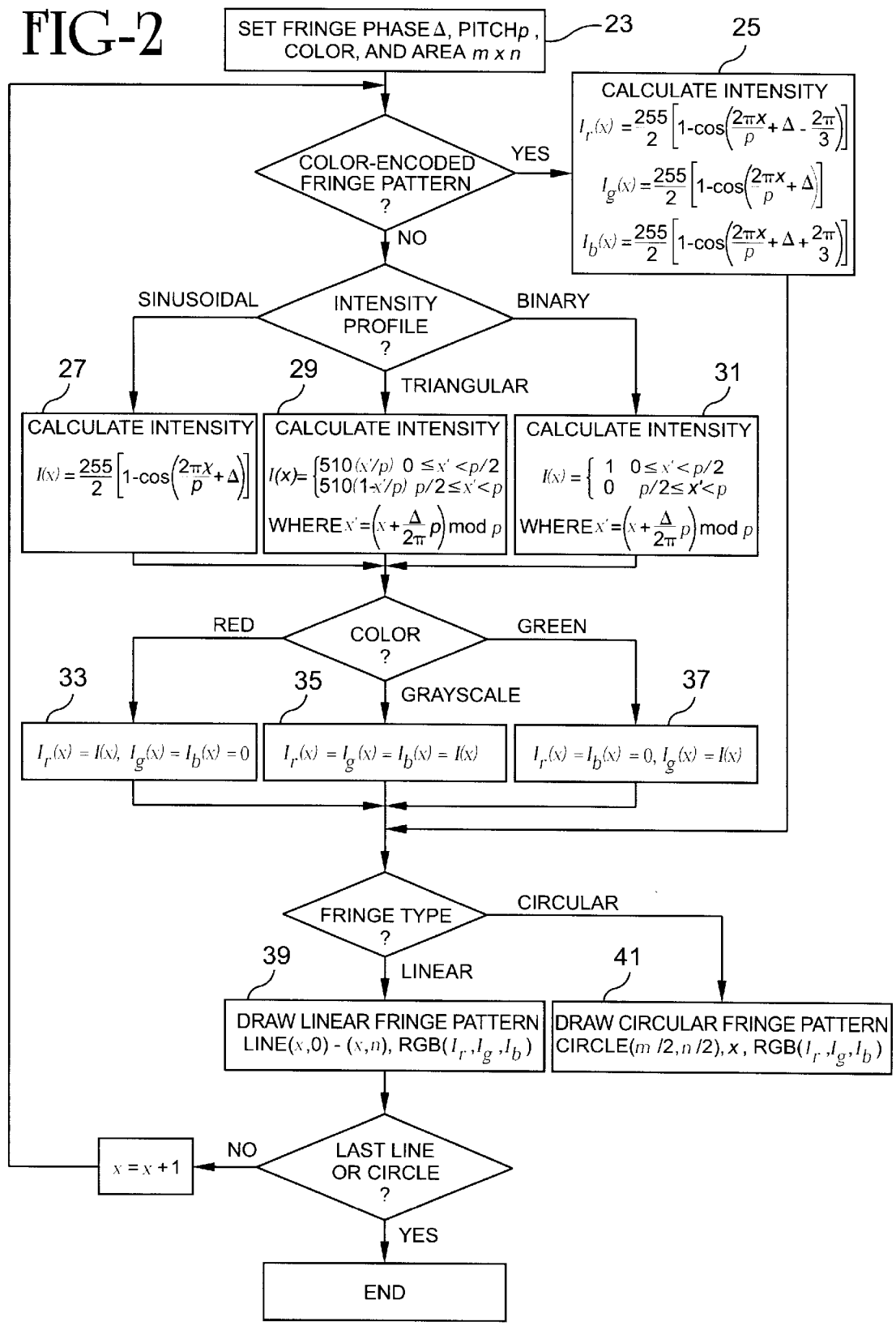
FIG. 2 is a flowchart illustrating an algorithm used by the fringe pattern generator.

Referring now to FIG. 2, a flowchart illustrating the algorithm used by the fringe pattern generator 16 is shown. Essentially the fringe pattern generator 16 assigns the intensity, I, and color for each pixel of the digital video projector 18. Referring to input block 23, initially the phase angle Δ, pitch p, color, and an array of pixels m×n of the digital video projector for projecting the fringe pattern are selected. If color encoding of the fringe pattern is desired, the intensities are determined as shown in block 25 where $I_r(x)$, $I_g(x)$, and $I_b(x)$ are the intensities of red, green, and blue that are assigned to each line or circle of pixels. Notice that $I_r(x)$, $I_g(x)$, and $I_b(x)$ are each phase shifted by $2\pi/3$ or 120 degrees. A mathematical formula for a sinusoidal fringe pattern is shown in block 25 by way of example only as it is contemplated that fringe patterns having other intensity profiles could be used as well, e.g., triangular. If a single color fringe pattern is to be generated, the intensity profile is determined next. Again by way of example only blocks 27, 29, and 31 include formulations for sinusoidal, triangular and binary intensity profiles respectively that are commonly used by those skilled in the art. Blocks 33, 35 and 37 illustrate examples of generating red, grayscale, and green fringe patterns respectively. Fringe patterns of other colors can be generated in a similar manner. The fringe type is selected next. As shown in blocks 39 and 41 fringe patterns are generally linear or circular, but could be arranged in any desired form. The process of assigning each pixel an intensity and color is repeated until the array m×n is completed.

Although it is preferable to phase shift digitally with the fringe pattern generator 16 as discussed above, in an alternative embodiment of the present invention the apparatus can further comprise a mechanical phase shifter for shifting the phase angle. Traditional mechanical phase shifters generally include motors to either translate a grating or the object being imaged, or rotate a glass plate that refracts the projected fringe pattern. Examples of mechanical phase shifters are found in U.S. Pat. No. 4,641,972 to Halioua et al., U.S. Pat. No. 4,984,893 to Lange, and U.S. Pat. No. 5,561,526 to Huber et al., the disclosures of which are incorporated herein by reference.

Referring now to FIG. 1, the digital video projector 18 receives the digitally-interpretable fringe pattern signal generated by the fringe pattern generator 16 and converts the signal into an optical fringe pattern and projects it onto the surface 14 of the object 12. Examples of phase shifted fringe patterns are shown in FIGS. 6A, 6B, and 6C which have phase angles of 0, 120 and −120 degrees respectively. The projected fringe pattern is then distorted by the geometry of the object 12. Preferably, the digital video projector 18 uses the Digital Light Processing (DLP) with Digital Micromirror Device (DMD) technology recently developed by Texas Instruments Incorporated. (Gove, R. J., "DMD Display Systems: The Impact of an All-Digital Display," Society for Information Display International Symposium (1994); Hornbeck, Larry, J., "Deformable-Mirror Spacial Light Modulators," Proc. SPIE, Vol. 1150 (1989); Hornbeck, Larry, J., "Current status of the digital micromirror device (DMD) for projection television applications," IEDM 15.1.1 (1993); Monk, D., "Digital Micromirror Device Technology for Projection Displays" EID Exhibition & Conference (Sandown,UK 1994), Sampbell, J. B., "The digital micromirror device," Proceedings of the 7th ICSS&A (Yokohama, Japan 1993); Sampbell, J. B., "An Overview of the performance Envelope of Digital Micromirror Device Based projection Displays," SID Digest, 669–672 (1994); and Younse, J. M., "Mirror on a chip," IEEE Spectrum, 30(11), 27 (1993) (all of which are incorporated herein by reference)). The Digital Light Processing (DLP) with Digital Micromirror Device (DMD) technology provides the benefits of high brightness, contrast ratio, and image quality when used in three-dimensional surface imaging. A brief overview of the DLP technology with reference to FIGS. 3 to 5 follows below.

Figure 3:
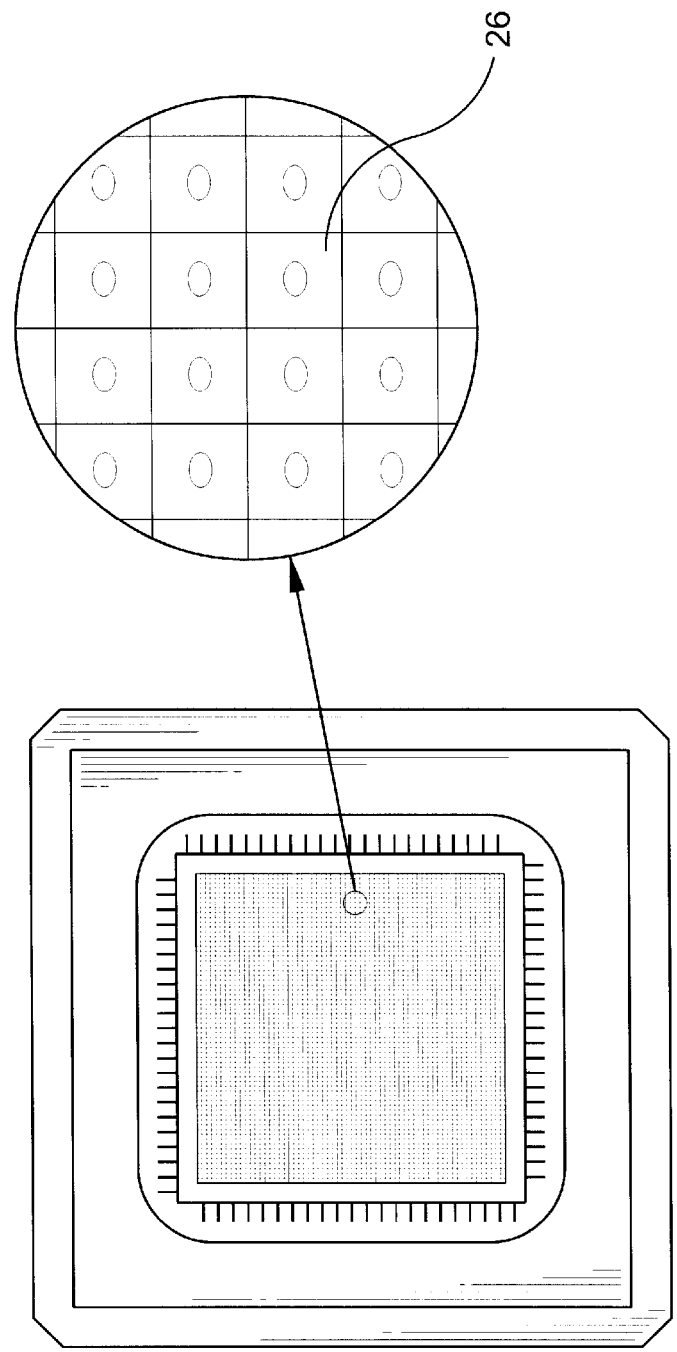
FIG. 3 is an elevational view of a Digital Mirror Device.
Figure 4:
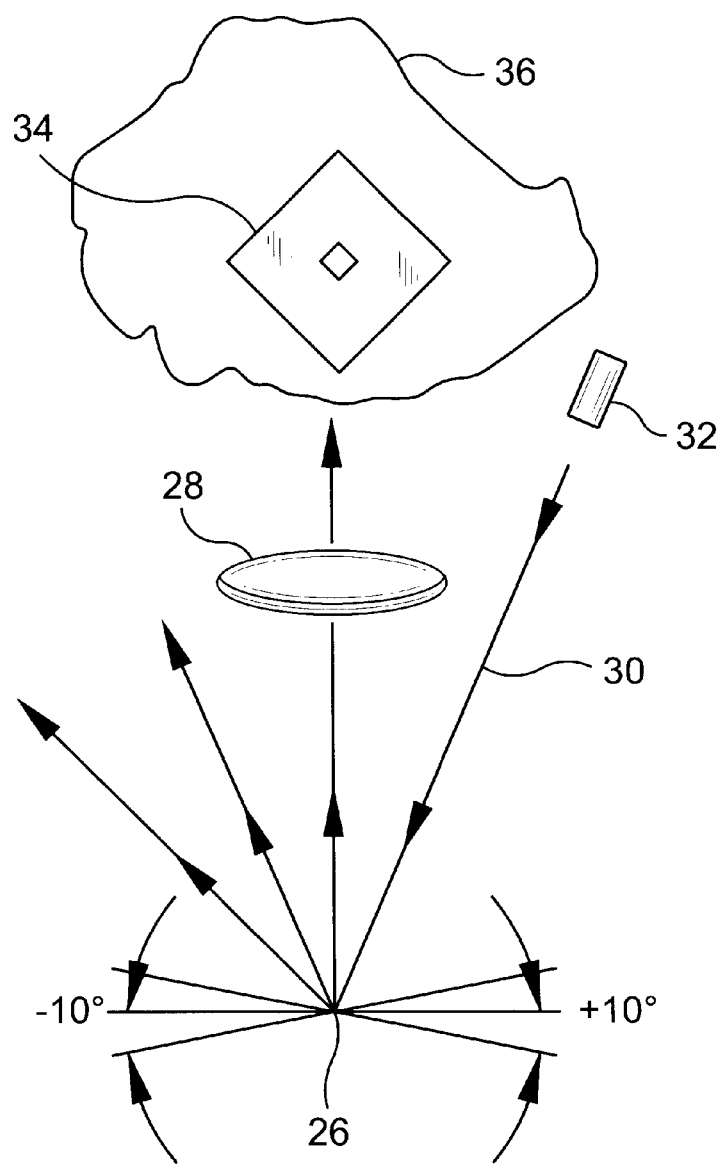
FIG. 4 is a schematic view illustrating the Digital Mirror Device switching principle.

Referring now to FIG. 3, the Digital Micromirror Device (DMD) 24 is a digital light switch integrated circuit having an upper surface that comprises an array of tiny square aluminum pixel mirrors 26. Each pixel mirror 26 of the DMD 24 can be digitally controlled to reflect incident light into or out of an aperture of a projection lens 28 as shown in FIG. 4. FIG. 4 which is adopted from "Digital Light Processing and MEMS: Timely Convergence for a Bright Future," illustrates the optical switching action of the mirror. When the pixel mirror 26 rotates to its on state, +10 degrees, light 30 from an illuminator 32 is directed into the projection lens 28 and the pixel 34 appears bright on a projection screen 36. When the pixel mirror 26 rotates to its off state, −10 degrees, light 30 from the illuminator 32 is directed away from the projection lens 28 and the pixel 34 appears dark. Each pixel mirror 26 is capable of switching more than 1,400 times a second and yields a potential of 256 gray levels providing for the rapid direction of light into or out of the projection lens 28.

Figure 5:
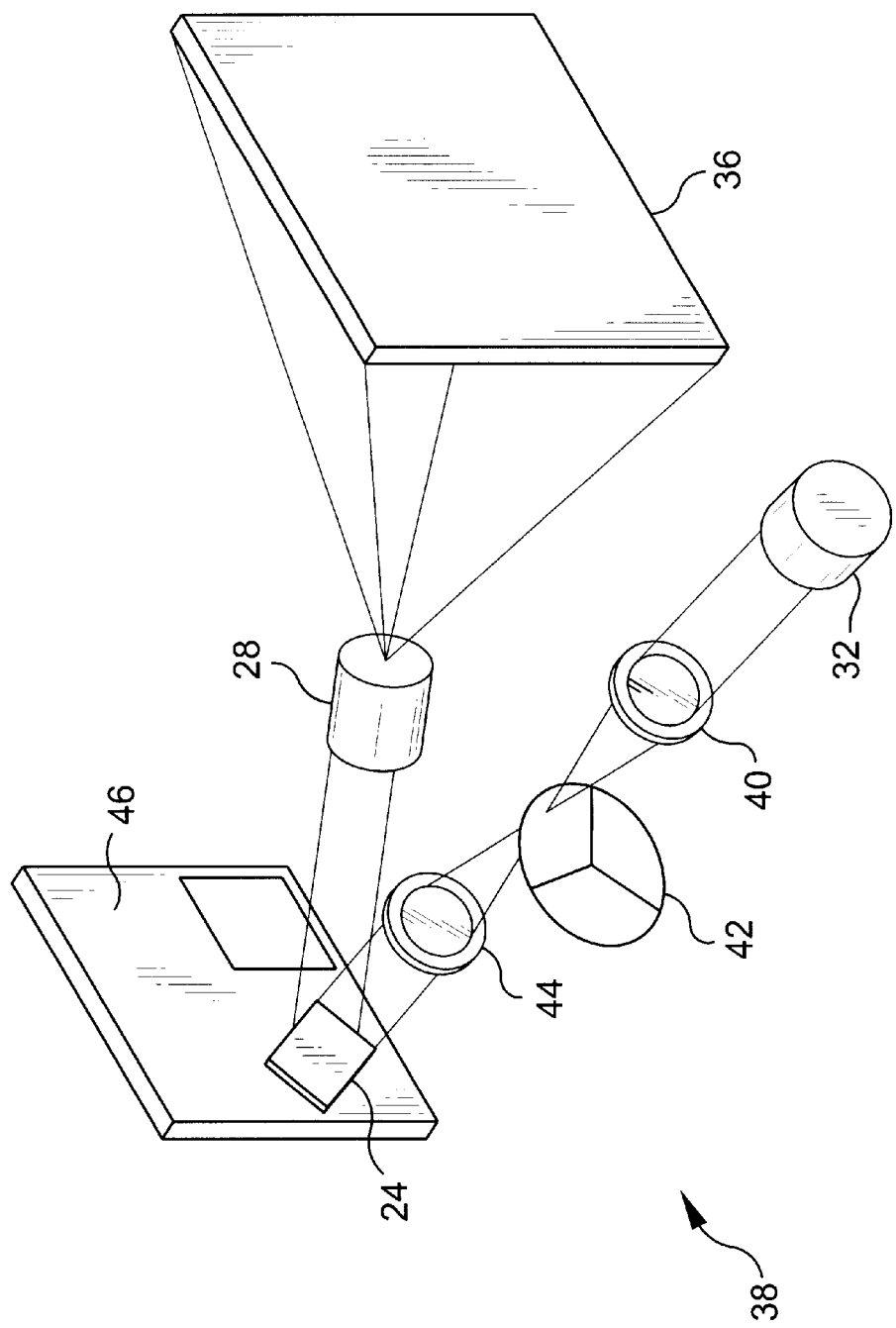
FIG. 5 is an exploded perspective view showing a Digital Light Processing projection system.
Figure 6A:
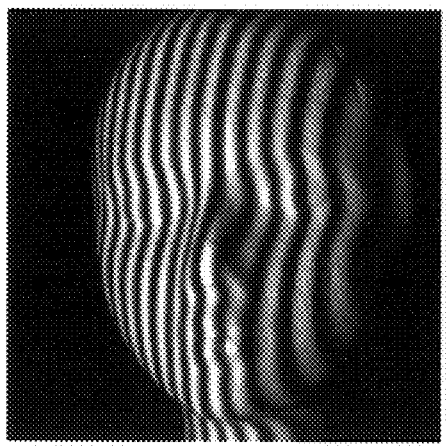
FIG. 6A is a view showing a fringe pattern being projected on a dummy face having a phase angle of 0 degrees.
Figure 6B:
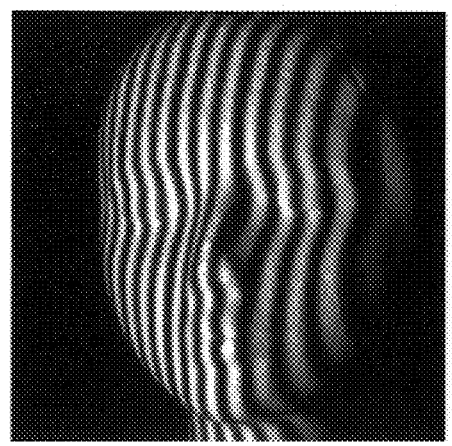
FIG. 6B is a view showing a fringe pattern being projected on a dummy face having a phase angle of 120 degrees.
Figure 6C:
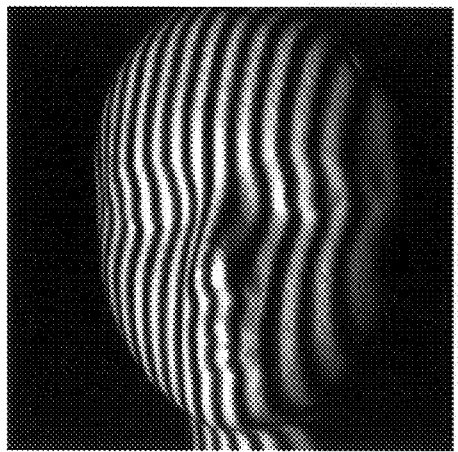
FIG. 6C is a view showing a fringe pattern being projected on a dummy face having a phase angle of −120 degrees.

Referring now to FIG. 5 which is also adopted from "Digital Light Processing and MEMS: Timely Convergence for a Bright Future," an example of a typical DLP projection system 38 is shown. The DLP projection system 38 includes an illuminator 32 which is preferably a metal halide lamp. The illuminator 32 produces white light which is passed through a condenser lens 40 for collecting the light and imaging it on a rotating color wheel 42. The color wheel 42 is generally segmented into at least a red, a green, and a blue portion, which can be used to project these components of colored light to produce over 16 million colors. A second lens 44 collects the light that passes through the color wheel 42 and evenly illuminates the surface of the DMD 24. Depending on the rotational state of each pixel mirror 26 (+10 or −10 degrees) of the DMD 24 which are controlled by a DLP circuit board 46, the light is directed either into or away from the projection lens 28. The projection lens 28 then projects an enlarged image on to a projection screen 36. A variety of digital video projectors 18 that use the DLP technology are presently commercially available. Some of the manufacturers include Davis North America, Inc., NEC Technologies Inc., CTX Opto Inc., and In Focus Systems. In the experimentation described herein, the inventors used the LitePro 620 as manufactured by In Focus Systems, Wilsonville, Oreg.

Referring now to FIG. 1, the optical retrieval device 20 retrieves a reflection of the distorted fringe patterns from the surface of the object 12. The optical retrieval device 20 is focused at a different angle than the digital video projector 18 with respect to the surface 14 of the object 12 for the retrieval of the reflection of the distorted fringe pattern. The optical retrieval device 20 can be any electronic camera, such as a CCD, CMOS, or Vidicon camera or film. Preferably the optical retrieval device 20 is a charge coupled device (CCD). A suitable camera for use with the teachings hereof is the Kodak Megaplus Model 4.2i having a charge-coupled device array of 2029(H)×2048(V) pixels providing for the measuring of over 4 million data points simultaneously.

The image generator 22 combines the distorted phase shifted fringe patterns and reconstructs the surface 14 of the object 12. The image generator 22 can be, for example, any suitable computer, processor (e.g., digital signal processor, microprocessor, etc.), microcontroller, or circuit configured with the teachings hereof. As illustrated in phantom in FIG. 1, the image generator 22 and the fringe pattern generator 16 can be located within the same housing, e.g., a computer. The reconstruction of the surface of the object is accomplished by using any of the traditional algorithms known from phase shift interferometry to first combine the information from the phase shifted fringe patterns to acquire a phase-wrapped image and then unwrap the phase-wrapped image to reconstruct the surface 14 of the object 12. An example of a phase-wrapped image is shown in FIG. 8 which was generated from the phase shifted images shown in FIGS. 6A, 6B, and 6C.

Initially, the image generator 22 extracts the phase of each pixel of the image to be generated. There are a variety of algorithms that are well known in the art for obtaining the phase. These algorithms include the three-step (Gallagher, J. E. and Herriott, D. R., "Wavefront measurement," U.S. Pat. No. 3,694,088 (1972); Creath, K. "Phase-Measurement Interferometry Techniques," in Progress in Optics. Vol XXVI, E. Wolf, Ed., Elsevier Science Publishers, Amsterdam, 1988, pp. 349–393), four-step least-squares (Bruning, J. H., Herriott, D. R., Gallagher, J. E., Rosenfeld, D. P., White, A. D., and Brangaccio, D. J., "Digital Wavefront Measuring Interferometer for Testing Optical Surfaces and Lenses," Appl. Opt., 13, 2693 (1974); Greivenkamp, J. E., "Generalized Data Reduction for Heterodyne Interferometry," Opt. Eng., 23, 350 (1984)), the Carre method (Carre, P., "Installation et Utilization du Comparateur Photoelectrique et Interferentiel du Bureau International des Poids de Measures," Metrologia 2, 13 (1996)), averaging 3+3 (Schwider, J. Burow, R., Elssner, K. E., Grzanna, J., Spolaczyk, R., and Merkel K., "Digital Wavefront Measuring Interferometry: Some Systematic Error Sources," Appl. Opt., 22, 3421 (1983); Wyant, J. C. and Prettyjohns, K. N., "Optical Profiler Using Improved Phase-Shifting Interferometry," U.S. Pat. 4,639,139 (1987)), the Hariharan method (Hariharan, P., Oreb, B. F., and Eiju, T., "Digital Phase-Shifting Interferometry: A Simple Error-Compensating Phase Calculation Algorithm," Appl. Opt., 26, 2504 (1987)), and 2+1 (Angel, J. R. P. and Wizinowich, P. L., "A Method of Phase-Shifting in the Presence of Vibration," European Southern Observatory Conf. Proc., 30, 561 (1988); Wizinowich, P. L., "System for Phase-Shifting Interferometry in the Presence of Vibration," Proc. SPIE, 1164, 25 (1989); Wizinowich, P. L., "Phase-Shifting Interferometry in the Presence of Vibration: A New Algorithm and System," Appl. Opt., 29, 3271 (1990)) algorithms. The aforementioned cited disclosures for obtaining the phase angle are incorporated herein by reference.

In the three-step algorithm, three phase shifted patterns are generated with each phase shifted pattern being generated at a separate phase angle. Preferably, the phase shifted patterns are separated by 120 degrees ($2\pi/3$). Where $\Delta_1$, $\Delta_2$, and $\Delta_3$ represent the separate phase angles, the intensity of each pixel in the three patterns can be represented as follows:

$$I_1(x,y)=I'(x,y)+I''(x,y)\cos[\phi(x,y)+\Delta_1] \quad (1)$$

$$I_2(x,y)=I'(x,y)+I''(x,y)\cos[\phi(x,y)+\Delta_2] \quad (2)$$

$$I_3(x,y)=I'(x,y)+I''(x,y)\cos[\phi(x,y)+\Delta_3] \quad (3)$$

where $I'(x,y)$ is the average intensity, $I''(x,y)$ is the intensity modulation, and $\phi(x,y)$ is the phase to be determined. Solving the above three equations simultaneously for $\phi(x,y)$ yields the following solution:

$$\tan\phi(x,y) = \frac{(I_3 - I_2)\cos\Delta_1 + (I_1 - I_3)\cos\Delta_2 + (I_2 - I_1)\cos\Delta_3}{(I_3 - I_2)\sin\Delta_1 + (I_1 - I_3)\sin\Delta_2 + (I_2 - I_1)\sin\Delta_3} \quad (4A)$$

By using phase shifts, $\Delta$, of 120 degrees with $\Delta_1=-120$, $\Delta_2=0$, and $\Delta_3=120$, the equation reduces down to:

$$\phi(x, y) = \tan^{-1}\left(\sqrt{3} I_1 - \frac{I_3}{2I_2 - I_1 - I_3}\right) \quad (4B)$$

With the signs of $(I_1-I_3)$ and $(2I_2-I_1-I_3)$ known, the above equation provides the so-called modulo $2\pi$ phase at each pixel with values between 0 and $2\pi$. Once $\phi(x,y)$ for each pixel is determined, a saw-tooth-like phase-wrapped image can be generated with the highest gray level corresponding to the phase of $2\pi$ and the lowest to 0. More than three phase shifted patterns can be generated and used in determining $\phi(x,y)$ for each pixel which generally translates into higher accuracy. However, the trade-off is longer processing time both in image retrieval and processing. In addition, the average intensity $I'(x,y)$, intensity modulation $I''(x,y)$, and data modulation $\gamma(x,y)$ can also be derived as follows:

$$I'(x, y) = \frac{I_1 + I_3 + I_2}{3}, \quad (5)$$

$$I''(x, y) = \frac{[3(I_1 - I_3)^2 + (2I_2 - I_1 - I_3)^2]^{1/2}}{3}, \quad (6)$$

$$\gamma(x, y) = \frac{I''(x, y)}{I'(x, y)} = \frac{[3(I_1 - I_3)^2 + (2I_2 - I_1 - I_3)^2]^{1/2}}{I_1 + I_2 + I_3} \quad (7)$$

The Data modulation $\gamma(x,y)$ can be used to check the quality of data at each pixel. A data modulation near one is good, whereas a data modulation near zero is bad meaning the fringes are washed out, saturated, out of focus, etc. Alternatively, the solutions for Equations (1) through (3) for the phase, the average intensity, intensity modulation, and data modulation can be determined by Fourier coefficients as suggested in U.S. Pat. No. 3,694,088 to Gallagher et al., the disclosure of which has been previously incorporated herein by reference.

The image generator 22 extracts the height information from the phase-wrapped image using a standard phase unwrapping algorithm. There are a variety of algorithms that are well known in the art for unwrapping the phase-wrapped image. General methods for unwrapping the phase-wrapped image are described in "Phase Shifting Interferometry," in Optical Shop Testing, by J. E. Greivenkamp and J. H. Bruning, 2d Ed., Daniel Malacara, John Wiley & Sons (1992) at pages 551–553. In addition, U.S. Pat. No. 5,307,152 to Boehnlein et al., the disclosure of which is incorporated herein by reference, discloses an algorithm (Col. 7, line 7 through Col. 8, line 43) for unwrapping a phase-wrapped image that was generated with Equation (4A) with phase shifts of 90 degrees.

In experimentation conducted by the inventors, the $2\pi$ discontinuity is first removed horizontally as follows:

$$f_x(x,y)=\phi(x,y)+2\pi k. \quad (8)$$

where k is the number of $2\pi$'s that needs to be added in order to remove the discontinuity. The number k can be positive or negative depending on the geometry of the surface. The application of Equation (8) to the phase-wrapped image provides a series of horizontal surface profiles that are not height related. In order to form a continuous surface, the height relations of the horizontal surface profiles needs to be determined. Assuming that the pixel number is M×N, this is accomplished by removing the $2\pi$ discontinuity vertically for the middle column as follows:

$$f_y(M/2,y)=\phi(M/2,y)+2\pi l, \quad (9)$$

where l is the number of $2\pi$'s that need to be added in order to remove the discontinuity vertically. The middle column vertical profile provides the height relations for the series of horizontal profiles generated by Equation (8). The final surface contour can be obtained by the following equation:

$$f(x,y)=[f_x(x,y)-f_x(M/2,y)-s_xx]+[f_y(M/2,y)-f_y(M/2,N/2)-s_yy], \quad (10)$$

where $$s_x=[f_x(M,N/2)-f_x(0,N/2)]/M, \quad (11)$$

$$s_y=[f_y(M/2,N)-f_y(M/2,0)]/N, \quad (12)$$

are the slopes of the middle row and the middle column respectively. The slopes are included in the equation to remove the tilt of the surface contour.

Figure 7:
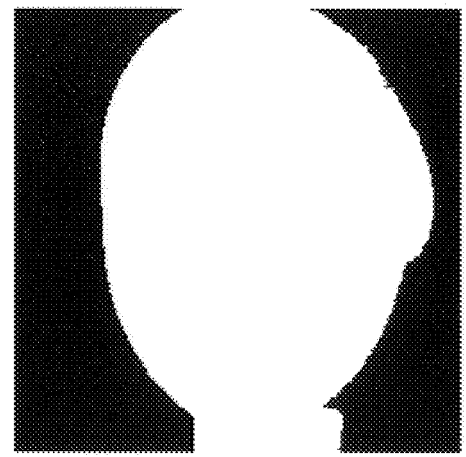
FIG. 7 is a view showing a mask generated to remove noise in the background of the phase-wrapped image.

The above algorithm is premised upon the object occupying the entire image. If the object occupies only part of the image as shown in FIGS. 6A, 6B, and 6C, then a mask is generated to define the boundaries of the object removing the noise in the background as shown in FIG. 7. The mask in FIG. 7 was generated by taking the average of the three reflected phase shifted fringe patterns and binarizing the average at a gray level of 20. The algorithm is modified to do phase unwrapping only within the boundaries of the object.

The operation of the embodiment of the invention shown in FIG. 1 along with a method of the invention will now be described in detail with reference to FIGS. 6A, 6B, 6C, 7 and 8 which illustrate the reconstruction of a dummy face. Initially, digitally-interpretable fringe pattern signal is generated with the fringe pattern generator 16. The signal is converted into an optical phase shifted fringe pattern and projected onto the surface 14 of the object 12 being imaged as shown in FIG. 6A. The fringe pattern is distorted by the geometry of the object and the reflection of this distorted fringe pattern is retrieved by the optical retrieval device 20 which forwards the reflection to the image generator 22. The phase angle is shifted after the optical retrieval device 20 retrieves the reflection and the process is repeated. Generally, when the three-step algorithm described above is used, a total of three phase shifted signals are generated. The phase angles of FIGS. 6A, 6B, and 6C are separated by 120 degrees. The image generator 22 combines the distorted fringe patterns to generate a phase-wrapped image as shown in FIG. 8 by extracting the phase of each pixel of the image as described above. In generating the phase-wrapped image shown in FIG. 8 noise in the background was removed by masking the boundaries of the object as shown in FIG. 7. Once the phase-wrapped image is generated, the image generator 22 reconstructs the surface 14 of the object 12 by unwrapping the phase-wrapped image.

In an alternative embodiment of the invention, the phase shifted fringe patterns are color encoded and projected substantially simultaneously. The inventors' initial experimentation using color encoding is described in SPIE Proceedings Vol. 3407, Paper No.: 3407-66, pp.477–482 entitled "Color-encoded fringe projection and phase shifting for 3D surface contouring" published on Sept. 29,1998, the disclosure of which is incorporated herein by reference. This embodiment of the invention will be explained with reference to FIGS. 10 through 13, which show images that were generated in reconstructing the three dimensional surface contour of a plaster sculpture of a head.

Referring now to FIG. 1, in this embodiment the fringe pattern generator 16 generates substantially simultaneously a plurality of phase shifted digitally-interpretable fringe pattern signals that are color encoded. When the three step algorithm is used for phase wrapping, preferably three signals are generated. The signals are encoded with information so that the optical fringe patterns are phase shifted by 120 degrees with each one having a separate color, e.g., red, green, and blue. Essentially, the fringe pattern generator 16 generates a signal containing the information of three phase shifted patterns superimposed, but color encoded for identifying the separate phase shifts for image reconstruction.

Figure 10:
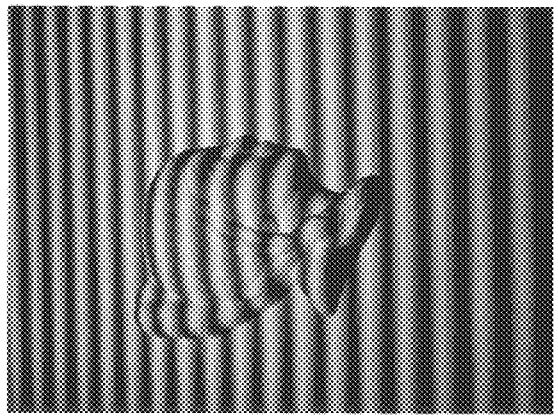
FIG. 10 is a view showing a color encoded fringe pattern being projected on a plaster head sculpture.

The digital video projector 18 receives the superimposed color encoded signal and converts the signal into a color encoded optical fringe pattern and projects it onto the surface 14 of the object as shown in FIG. 10. The fringe pattern shown in FIG. 10 includes the three phase shifted components shown in FIGS. 11A, 11B, and 11C. In using digital video projectors that are currently commercially available, color can be added by three different mechanisms. Where a projector has only one DMD chip as described above with reference to FIG. 5, the color is added by the use of a rotating RGB color wheel. In projectors that have two DMD chips, one chip is dedicated to red and the other chip to green and blue. A color wheel with yellow and magenta filters is used to provide a continuous red beam and an alternating green and blue beam. In three-chip projectors, a DMD chip is dedicated for red, green, and blue. As expected the three-chip system provides the best light efficiency, but is also the most expensive. When using a three-chip projector the three phase shifted components shown in FIGS. 11A, 11B, and 11C can truly be projected simultaneously. When using a single-chip projector that uses the rotating color wheel, the three phase shifted components are also projected simultaneously with each component being intermittently projected. The intermittent projection is dependent upon the location of the rotating color wheel with respect to the light being passed therethrough.

When using color encoded fringe patterns, the optical retrieval device 20 is a color camera. Preferably, the optical retrieval device 20 is a three-CCD color video camera providing high resolution because each CCD can be dedicated to one color channel. The optical retrieval device retrieves the reflection of the optical fringe pattern shown in FIG. 10. In the inventors' experimentation, a digital camera from Kodak (Model DC210) which has 1152×864 pixels was used. The camera has a color CCD sensor that produces color images based on a filter array technique that has 50% of the pixels filtered for green and 25% each for red and blue. There are more pixels filtered for green than those for red and blue because human eyes are most sensitive to green. The reflections retrieved by the camera were transferred to an image generator 22 using Kodak's Easy Picture software.

Figure 11A:
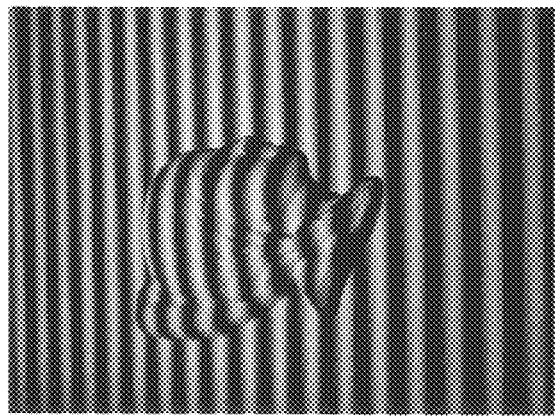
FIG. 11A is a view showing the red channel of the color encoded fringe pattern shown in FIG. 10 having a phase angle of −120 degrees.
Figure 11B:
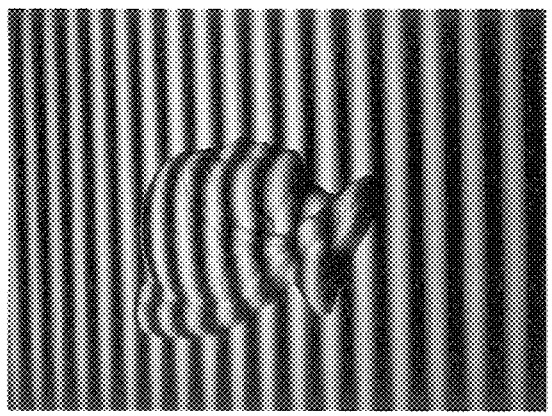
FIG. 11B is a view showing the green channel of the color encoded fringe pattern shown in FIG. 10 having a phase angle of 0 degrees.
Figure 11C:
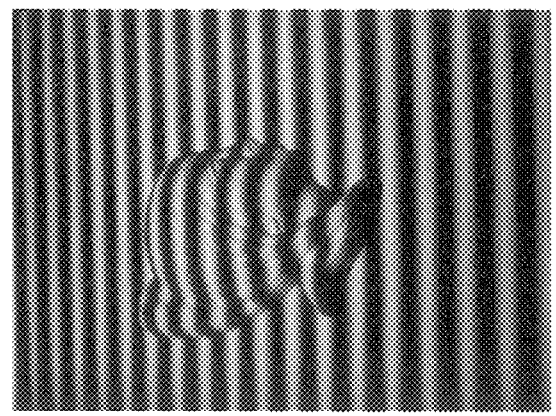
FIG. 11C is a view showing the blue channel of the color encoded fringe pattern shown in FIG. 10 having a phase angle of 120 degrees.

The image generator 22 first separates the reflection shown in FIG. 10 into its RGB components as shown in FIGS. 11A, 11B, and 11C. After the RGB components are acquired, the RGB components are combined through the standard phase wrapping and unwrapping algorithms described above, but with modifications for color coupling and color intensity as discussed below. In the inventors' experimentation, Aldus PhotoStyler image processing software was used to separate the RGB components of the reflection. The modifications discussed below relate to the specific experiments conducted by the inventors. As the discussion will highlight, those skilled in the art will understand that similar modifications may be necessary, but will depend upon the specific application of the invention.

Since the color encoding technique requires that the reflection be separated into RGB components, the outcome of contouring is dependent upon the quality of the separation. Generally in all color cameras, the spectra of red, green, and blue channels are usually made to have some overlaps so that there will be no color-blind areas on the spectrum. This implies that the complete separation of the three phase shifted fringe patterns is not likely. However, since the degrees of overlaps are fixed, compensation for the coupling effects can be done after the image has been taken. Experiments were conducted to find the degree of coupling effects between the three color channels. The target used for this experiment was a flat, white-painted foam board. Purely red, green, and blue fringe patterns were projected in sequence. For each color, three phase shifted images ($-2\pi/3$, 0, $2\pi/3$) were taken which resulted in a total of nine images. The images were then separated into their RGB components, which resulted in a total of 27 images. From these images, the intensity modulation I" (x,y) was calculated according to Equation (6) for each set of the phase-shifted images. The ratios of I" (x,y) values between channels indicated the degree of coupling effects between these channels. It was determined that there was a strong coupling effect between the red and green channels, but a much weaker one between the green and blue channels. The strong coupling effect between the red and green channels cannot be attributed to the overlap of spectra of the two colors alone. Color distortion by the projector and the camera may have caused the major part of it because when comparing the red or green fringe pattern projected on the object and with that on a video monitor, a difference in color was noted. To compensate for this coupling effect, the following equations were used to calculate the compensated intensities:

$$I_{rc}(x,y) = [I_r(x,y) - aI_g(x,y)]/(1-ab) + c. \quad (13)$$

$$I_{gc}(x,y) = [I_g(x,y) - bI_r(x,y)]/(1-ab) + c. \quad (14)$$

$$I_{bc}(X,Y) = I_b(x,y) + c. \quad (15)$$

where $I_r(x,y)$, $I_g(x,y)$ and $I_b(x,y)$ are the original intensities and $I_{rc}(x,y)$, $I_{gc}(x,y)$, and $I_{bc}(x,y)$ are the compensated intensities for the red, green, and blue channels, respectively, a and b represent coupling effect between the red and green channels, and c is the offset that is necessary to keep the intensity values between 0 and 255. The coupling effect between the green and blue channels was ignored. Experimental results showed that this compensation scheme reduced the errors caused by the coupling effect significantly.

In addition to the coupling effects between the color channels, a correction for an intensity imbalance between the images of the red, green, and blue fringe patterns may be required. In the experimentation, red was the weakest and green was the strongest. Since the input intensities for the three colors were the same (255 levels), this imbalance was caused mostly by the digital video projector, which used a metal halide lamp that is red-light deficient. To compensate for this imbalance, the amplitudes of the fringe patterns for the three colors was adjusted. It was determined that changing the amplitude for the green and blue colors to 210 and keeping the amplitude for the red color at 255 produced the best results.

Figure 12:
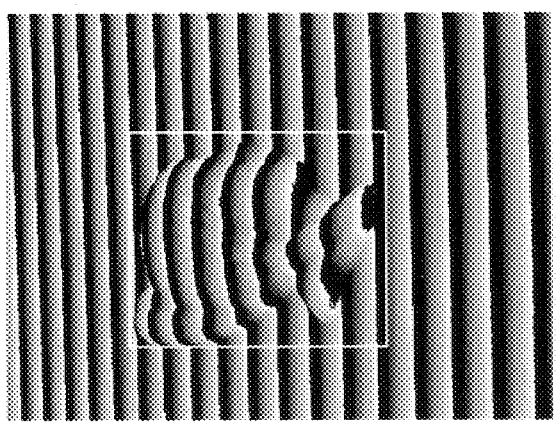
FIG. 12 is a view showing a phase-wrapped image generated from the information contained in FIGS. 11A, 11B, and 11C.
Figure 13:
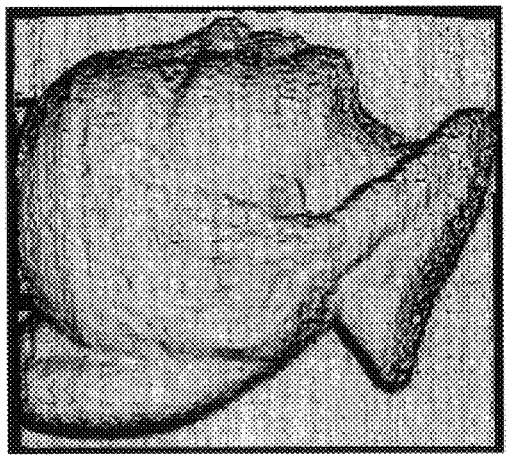
FIG. 13 is a view showing a reconstructed surface of the plaster head sculpture shown in FIGS. 11A, 11B, and 11C.

In summary, when color encoding is used, only one reflection of the object is required to obtain its three dimensional contour thus increasing contouring speed. FIG. 10 shows the reflection of the color encoded optical fringe pattern wherein the amplitudes for the three colors are adjusted as described above. FIGS. 11A, 11B, and 11C show the three phase shifted RGB components extracted from FIG. 10 before compensation for the coupling effect. FIG. 12 shows the phase-wrapped image that was generated after compensation for coupling effects, and FIG. 13 shows the reconstructed 3-D image of the object that was only unwrapped in the area enclosed in the central rectangle shown in FIG. 12.

In another embodiment of the invention, the sequential projection of the phase shifted fringe patterns are synchronized to increase contouring speed. To accomplish the synchronization the apparatus of the invention as shown in FIG. 1 further comprises a synchronizing link 48 which connects the fringe pattern generator 16 to the image generator 22. The synchronizing link 48 can simply be a connection that provides for the coordination between the initial generation of the digitally-interpretable fringe pattern signal and the retrieval of the reflection of each distorted fringe pattern. This connection can be either be software based or be embedded in the circuitry of either the fringe pattern generator 16 or the image generator 22.

Alternatively, a unique operating principle of a single DMD chip digital projector 18 as shown in FIG. 5 can be used to control the synchronization. Initially a plurality of phase shifted digitally-interpretable fringe pattern signals that are color encoded are generated by the fringe pattern generator 16. When sent to the digital projector 18, the RGB components of this color encoded fringe pattern signal will be projected sequentially and repeatedly at a frequency of 60 Hz. Referring again to FIG. 5, if the color wheel 42 of the projector is disengaged, the RGB components of the fringe pattern will actually be projected in grayscale. By synchronizing image retrieval with the projection of these three component fringe patterns, three phase-shifted images of the object can be taken in a very short period, thus boosting up the three dimensional imaging speed significantly. Hardware based image processing and graphics display can also be used to increase the speed of three dimensional reconstruction so that three dimensional imaging at the video rate (30 frames/sec) can be realized.

The present invention also contemplates that the image generator 22 can be connected to or include an output device for the display or further consideration of the imaging results. More specifically, the output device can include a video monitor or printer for simply displaying the results of the imaging. On the other hand, in quality control applications where the invention is used for the inspection of industrial parts whose parts need to be checked against their design specifications during or after manufacturing, the image can be compared against a mathematical model of the standard part to determine whether there are any defects in the manufactured part. In addition, when an industrial part is determined to have defects the image generator 22 can be linked to the fringe pattern generator 16 to generate a signal so that the digital video projector 18 projects information concerning defects. The information concerning the defects can include for example the nature, severity, and area of the defects. The information can also be projected in a variety of ways including: projecting the location of the defects on the part that is being imaged; projecting text describing the defects; projecting colors on the surface of the object; and projecting icons that have a meaning defined by the user. A specific example where the invention can be used for inspection purposes is in the sheet metal manufacturing industry. The invention can also be used in the assembling processes of sheet metal parts which are clamped at various positions. Wrong clamping positions can cause large deformations in the sheet metal parts. With the present invention, the deformation of the sheet metal part can be inspected quickly after clamping and the results can be projected on to the sheet metal surface. The clamping positions can then be adjusted until optimal positions are located.

In another embodiment of the invention, the optical projected fringe patterns are optimized to improve surface contouring. In surface contouring by moiré interferometry or fringe projection the resolution is generally dependent upon fringe spacing and contrast in the fringe pattern reflected from the object surface. Since fringe spacing and contrast in the reflected fringe pattern depend on the slope and reflectivity of the surface of the object, the spacing and contrast of the projected fringe pattern should be optimized based on the condition of the surface in order to achieve optimized contouring results. In traditional methods, the spacing and contrast are assigned one value for the entire surface that is being imaged. With the present invention, the object being imaged can be initially reconstructed as described above. The image generator 22 then determines the optimal fringe spacing and contrast based upon the initial reconstructed image and through a link to the fringe pattern generator 16 adjusts the fringe pattern signal accordingly. A second reconstructed image is then obtained using the adjusted fringe pattern signal. In another embodiment, the image generator 22 first divides the reconstructed image into a plurality of separate areas with each area being characterized in that it requires a similar fringe pattern for optimal surface contouring. The image generator 22 then assigns each area its optimal fringe spacing and contrast. A second reconstructed image is obtained as described above. In an alternative embodiment, the image generator 22 first generates a duplicate of the reconstructed image. The reconstructed image is divided into a plurality of separate areas with each area being characterized in that it requires a similar fringe spacing for optimal surface contouring. The duplicate of the reconstructed image is divided into a plurality of separate areas with each area being characterized in that it requires a similar fringe contrast for optimal surface contouring. The image generator 22 then superimposes the results to assign the entire surface both its optimal fringe spacing and contrast. A second reconstructed image is obtained as described above. The optimizing steps in all embodiments can be repeated as required, but it is expected that only one iteration is necessary for most applications.

In another embodiment of the invention, the fringe pattern is ordered to address the problems associated with discontinuities in the surface of the object. In one method, prior to projecting the fringe patterns, a single fringe is digitally projected and scanned through the surface of the object. While scanning, a plurality of reflected images are retrieved to locate the position of areas with discontinuous features. The reconstruction of the surface is then done in accordance with the invention as described above, but with one fringe encoded with a different color or intensity running through each area identified as having a discontinuous feature. The encoded fringe is now used to reference fringes from which the remaining fringes are ordered. The additional information known from the fringe order is used in phase unwrapping to correctly reconstruct any discontinuous features in the surface of the object. In an alternative method, all of the fringes of the fringe pattern are color encoded with a plurality of different colors forming a fringe pattern that is similar to a rainbow. The rainbow pattern can be periodically repeated at a sufficient spacing to insure that there is no overlapping of similar colors. Each fringe can now be ordered on the basis of its rainbow color profile so that any discontinuous features in the surface of the object can be correctly reconstructed during phase unwrapping.

In another method for addressing the problems associated with discontinuities in the surface of the object, a first surface contour is initially extracted by triangulation as known in the art from a plurality of reflected images acquired by projecting and scanning a single fringe through the surface of the object. Since only one image exists in each image, there is no fringe order confusion nor modulo $2\pi$ ambiguity problem. The surface contour obtained through triangulation is correct, but the tradeoff is that it provides low resolution. A second surface contour is now obtained using the phase shifting method which provides a high resolution of the surface contour but cannot extract the correct height information at surface discontinuities. Once both surface contours are obtained the image generator combines the information from both images to provide a surface contour having high resolution and correct height information at discontinuities.

In another embodiment of the invention, the fringe pattern generator 16 is configured to generate a plurality of digitally-interpretable signals so that the digital video projector 18 projects a plurality of spots or cross-hairs at various points on the surface of the object for determining range information. To determine the range information, initially at least three spots or cross-hairs are projected onto separate points on the object. The spots or the centers of the cross-hairs are retrieved by the optical retrieval device 20 and using the principles of triangulation the distance to each point is determined by the image generator 22. The distance information of at least three points on the surface combined with the surface shape obtained by the phase shifting method uniquely determines the absolute position, orientation, and shape of the object surface in space. This measurement of absolute position, orientation, and shape is useful, for example, in providing 360-degree measurement of object surface where patches of object surface measured at different angles need to be connected to form a seamless 360-degree shape.

Thus, while there have been described what are presently believed to be the preferred embodiments of the invention, those skilled in the art will realize that changes and modifications may be made thereto without departing from the spirit of the invention, and is intended to claim all such changes and modifications as fall within the true scope of the invention.

What is claimed is:

1. A method of providing a three-dimensional data-bearing fringe pattern on a surface of an object, said method comprising the steps of:

(a) generating a digitally-interpretable fringe pattern signal, said signal including a plurality of parameters for defining an optical fringe pattern, said plurality of parameters including at least fringe type, intensity profile, spacing, and color;

(b) converting said signal with at least one digital micromirror device into said optical fringe pattern; and (c) projecting said fringe pattern onto said surface of said object.

2. An apparatus for projecting a fringe pattern onto a surface of an object, said apparatus comprising:

a fringe pattern generator for generating a digitally-interpretable fringe pattern signal, said signal including a plurality of parameters for defining an optical fringe pattern, said plurality of parameters including at least fringe type, intensity profile, spacing, and color, and a digital video projector having at least one digital micromirror device and being connected to said fringe pattern generator for receiving and converting said signal into said optical fringe pattern and projecting said fringe pattern onto said surface of said object.

3. An apparatus for projecting a fringe pattern as defined in claim 2, wherein said fringe pattern generator is a circuit configured to generate said fringe pattern.

4. An apparatus for projecting a fringe pattern as defined in claim 2, wherein said fringe pattern generator is a computer programmed to generate said fringe pattern.

5. A method of three dimensional surface contouring of an object having a surface defining a geometry, said method comprising the steps of:
   (a) generating a plurality of phase shifted digitally-interpretable fringe pattern signals, each of said signals being generated at a separate phase angle and including a plurality of parameters for defining an optical fringe pattern, said plurality of parameters including at least fringe type, intensity profile, spacing, and color;
   (b) converting said signals into optical phase shifted fringe patterns with at least one digital micromirror device;
   (c) projecting said fringe patterns onto said surface, said fringe patterns being distorted by said geometry of said object;
   (d) retrieving a reflection of each of said distorted fringe patterns individually;
   (e) generating a phase-wrapped image by combining said distorted fringe patterns; and
   (f) reconstructing said surface of said object by unwrapping said phase-wrapped image.

6. A method of three dimensional surface contouring as defined in claim 5, wherein at least three phase shifted fringe patterns are generated separated by 120 degrees.

7. A method of three dimensional surface contouring as defined in claim 5, wherein each of said phase shifted fringe patterns are projected sequentially.

8. A method of three dimensional surface contouring as defined in claim 5, wherein said plurality of phase shifted fringe patterns are color encoded and projected substantially simultaneously.

9. A method of three dimensional surface contouring as defined in claim 5, wherein said plurality of phase shifted digitally-interpretable fringe pattern signals are color encoded and said optical fringe patterns are projected in grayscale.

10. A method of three dimensional surface contouring as defined in claim 5, further comprising the steps of:
    (g) determining an optimal fringe spacing based upon said reconstructed surface; and
    (h) reconstructing a second surface of said object by repeating steps (a) through (f) with said optimal fringe spacing.

11. A method of three dimensional surface contouring as defined in claim 5, further comprising the steps of:
    (g) dividing said reconstructed surface into a plurality of areas, each of said plurality of areas requiring a separate optimal fringe spacing
    (h) determining said separate optimal fringe spacing for each of said plurality of areas based upon said reconstructed surface; and
    (i) reconstructing a second surface of said object by repeating steps (a) through (f) with said separate optimal fringe spacing for each of said plurality of areas.

12. An apparatus for three dimensional surface contouring of an object having a surface defining a geometry, said apparatus comprising:
    a fringe pattern generator for generating a plurality of phase shifted digitally-interpretable fringe pattern signals, each of said signals being generated at a separate phase angle and including a plurality of parameters for defining an optical fringe pattern, said plurality of parameters including at least fringe type, intensity profile, spacing, and color;
    a digital video projector having at least one digital micromirror device and being connected to said fringe pattern generator for receiving and converting said signals into optical fringe patterns and protecting said fringe patterns onto said surface where said fringe patterns are distorted by said geometry of said object;
    an optical retrieval device for retrieving a reflection of said distorted Singe patterns; and
    an image generator which combines said distorted fringe patterns and reconstructs said surface of said object.

13. An apparatus for three dimensional surface contouring as defined in claim 12, wherein said fringe pattern generator is a circuit configured to generate said fringe pattern.

14. An apparatus for three dimensional surface contouring as defined in claim 12, wherein said fringe pattern generator comprises a circuit located within said image generator and programmed to generate said fringe pattern.

15. An apparatus for three dimensional surface contouring as defined in claim 12, wherein said fringe pattern generator further comprises a mechanical phase shifter for shifting said phase angle.

16. An apparatus for three dimensional surface contouring as defined in claim 12, wherein said fringe pattern generator shifts said phase angle digitally.

17. An apparatus for three dimensional surface contouring as defined in claim 12, wherein each of said phase shifted fringe patterns are projected sequentially.

18. An apparatus for three dimensional surface contouring as defined in claim 12, wherein said plurality of phase shifted fringe patterns are color encoded and projected substantially simultaneously.

19. An apparatus for three dimensional surface contouring as defined in claim 12, wherein there are three phase shifted fringe patterns separated by 120 degrees.

20. An apparatus for three dimensional surface contouring as defined in claim 12, wherein there are a number of phase shifted fringe patterns which are separated by the quotient of 360 degrees divided by said number.

21. An apparatus for three dimensional surface contouring as defined in claim 12, further comprises a synchronizing link connecting said fringe pattern generator to said image generator to increase contouring speed.

22. An apparatus for three dimensional surface contouring as defined claim 12, wherein said plurality of phase shifted digitally-interpretable fringe pattern signals are color encoded and said optical fringe patterns are projected in grayscale.

23. An apparatus for three dimensional surface contouring as defied in claim 12, wherein said image generator is configured to determine an optimal fringe spacing based upon said reconstructed surface and is linked to said fringe patter generator for generating a plurality of optimized phase shifted digitally-interpretable fringe patter signals for the reconstruction of a second surface of said object with said optimal fringe spacing.

24. An apparatus for three dimensional surface contouring as defined in claim 12, wherein said image generator is configured to:
    divide said reconstructed surface into a plurality of areas, each of said plurality of areas requiring a separate optimal fringe spacing; and
    determine said separate optimal fringe spacing for each of said plurality of areas based upon said reconstructed surface,
    said image generator being linked to said fringe pattern generator for generating a plurality of optimized phase shifted digitally-interpretable fringe pattern signals for the reconstruction of a second surface of said object with said separate optimal fringe spacing for each of said plurality of areas.

* * * * *

UNITED STATES PATENT AND TRADEMARK OFFICE
CERTIFICATE OF CORRECTION

PATENT NO. : 6,438,272 B1  
DATED : August 20, 2002  
INVENTOR(S) : Huang et al.

Page 1 of 1

It is certified that error appears in the above-identified patent and that said Letters Patent is hereby corrected as shown below:

Title page,  
Item [74], *Attorney, Agent, or Firm,* now reads "Hoffman & Baron, L.L.P." should read -- Hoffmann & Baron, L.L.P. --.  
Item [57], ABSTRACT,  
Line 3, now reads "fall-field" should read -- full-field --.

Column 9,  
Lines 45-50, now reads

" $I_1(x,y) = I'(x,y)+I''(x,y) \cos[(x,y)+\Delta_1]$ (1)  
$I_2(x,y) = I'(x,y)+I''(x,y) \cos[(x,y)+\Delta_2]$ (2)  
$I_3(x,y) = I'(x,y)+I''(x,y) \cos[(x,y)+\Delta_3]$ (3) "

should read -- $I_1(x,y) = I'(x,y)+I''(x,y) \cos[\phi(x,y)+\Delta_1]$ (1)  
$I_2(x,y) = I'(x,y)+I''(x,y) \cos[\phi(x,y)+\Delta_2]$ (2)  
$I_3(x,y) = I'(x,y)+I''(x,y) \cos[\phi(x,y)+\Delta_3]$, (3) --

Lines 61-65, now reads " $\phi(x, y) = \tan^{-1}\left(\sqrt{3} I_1 - \frac{I_3}{2I_2 - I_1 - I_3}\right)$ "

should read -- $\phi(x, y) = \tan^{-1}\left(\sqrt{3} \frac{I_1 - I_3}{2I_2 - I_1 - I_3}\right)$ --

Column 18,  
Line 6, now reads "Singe patterns" should read -- fringe patterns --  
Lines 47 and 48, now reads "patter" should read -- pattern --

Signed and Sealed this

Eighteenth Day of February, 2003

JAMES E. ROGAN  
*Director of the United States Patent and Trademark Office*